United States Patent
Neumann et al.

(10) Patent No.: US 9,922,068 B2
(45) Date of Patent: *Mar. 20, 2018

(54) ACCESSING DATA ENTITIES

(71) Applicant: INTERNATIONAL BUSINESS MACHINES CORPORATION, Armonk, NY (US)

(72) Inventors: Frank Neumann, Boeblingen (DE); Gerhard Pfau, Breitenstein (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,170

(22) Filed: May 8, 2016

(65) Prior Publication Data
US 2016/0253371 A1    Sep. 1, 2016

Related U.S. Application Data

(63) Continuation of application No. 13/295,545, filed on Nov. 14, 2011, now Pat. No. 9,342,548, which is a (Continued)

(30) Foreign Application Priority Data

Aug. 30, 2007 (EP) .................................... 07115273

(51) Int. Cl.
*G06F 17/30* (2006.01)

(52) U.S. Cl.
CPC .... *G06F 17/30362* (2013.01); *G06F 17/3048* (2013.01); *G06F 17/30345* (2013.01); *G06F 17/30356* (2013.01)

(58) Field of Classification Search
CPC ......... G06F 17/30902; G06F 17/30345; G06F 17/30356; G06F 17/30362; G06F 17/3048
See application file for complete search history.

(56) References Cited

U.S. PATENT DOCUMENTS 5,574,902 A * 11/1996 Josten ............... G06F 17/30377
5,596,754 A * 1/1997 Lomet ..................... G06F 9/526
                                                   707/E17.007
(Continued)

FOREIGN PATENT DOCUMENTS

WO         9721177 A1    6/1997
WO     2009027138 A1    3/2009

OTHER PUBLICATIONS

Michael J. Franklin and Michael J. Carey, "Client-Server Caching Revisited", May 1992, Technical Report #1089, pp. 1-32.*

(Continued)

*Primary Examiner* — Kris Mackes
*Assistant Examiner* — Merilyn Nguyen
(74) *Attorney, Agent, or Firm* — Cuenot, Forsythe & Kim, LLC

(57) ABSTRACT

Data entities in a client-server system are accessed. The client-server system comprises a set of clients, a server system, and a repository for storing a plurality of data entities. The server system comprises an inter-transactional cache, the inter-transactional cache being accessible for each client of the set of clients. A first client of the set of clients comprises a first intra-transactional cache. If a copy of a first data entity is in the inter-transactional cache, a version identifier of the original first data entity is read from the repository. If the copy of the first data entity is to be accessed with an exclusive lock, a copy of the copy of the first data entity is added to the first intra-transactional cache. The copy of the copy of the first data entity in the first intra-transac- (Continued)

tional cache is accessed for further processing of the first data entity by the first client.

12 Claims, 5 Drawing Sheets

Related U.S. Application Data continuation of application No. 12/199,632, filed on Aug. 27, 2008, now Pat. No. 8,117,159.

(56) References Cited

U.S. PATENT DOCUMENTS

| | | | | |
|---|---|---|---|---|
| 5,832,484 | A | * | 11/1998 | Sankaran .......... G06F 17/30362 |
| 5,897,634 | A | * | 4/1999 | Attaluri ............ G06F 17/30607 |
| 5,946,711 | A | | 8/1999 | Donnelly |
| 6,597,366 | B1 | | 7/2003 | Benett et al. |
| 6,973,549 | B1 | * | 12/2005 | Testardi .................. G06F 9/526 |
| | | | | 707/E17.005 |
| 7,136,969 | B1 | * | 11/2006 | Niver .................. G06F 12/0808 |
| | | | | 370/394 |
| 7,497,366 | B2 | | 2/2009 | Banks et al. |
| 7,716,182 | B2 | | 5/2010 | Tewksbary |
| 7,818,296 | B2 | | 10/2010 | Holt |
| 8,117,159 | B2 | | 2/2012 | Neumann et al. |
| 9,342,548 | B2 | | 5/2016 | Neumann et al. |
| 2002/0087596 | A1 | | 7/2002 | Lewontin |
| 2002/0166031 | A1 | * | 11/2002 | Chen .................. G06F 12/0813 |
| | | | | 711/141 |
| 2003/0217081 | A1 | * | 11/2003 | White ................. G06F 12/0813 |
| 2004/0128328 | A1 | | 7/2004 | Leff et al. |
| 2004/0153576 | A1 | * | 8/2004 | Hansmann ........ G06F 17/30902 |
| | | | | 709/248 |
| 2006/0112237 | A1 | * | 5/2006 | Chen .................. G06F 12/0837 |
| | | | | 711/144 |
| 2006/0265704 | A1 | | 11/2006 | Holt |
| 2007/0118523 | A1 | | 5/2007 | Bresch et al. |
| 2008/0243847 | A1 | | 10/2008 | Rasmussen |
| 2009/0063489 | A1 | | 3/2009 | Neumann et al. |
| 2009/0235034 | A1 | | 9/2009 | Holt |
| 2010/0023532 | A1 | * | 1/2010 | Yoshimura .......... G06F 11/2089 |
| | | | | 707/E17.005 |
| 2010/0094710 | A1 | * | 4/2010 | Ramakrishna ......... G06Q 30/02 |
| | | | | 705/14.64 |
| 2012/0059796 | A1 | | 3/2012 | Neumann et al. |
| 2012/0059808 | A1 | | 3/2012 | Neumann et al. |

OTHER PUBLICATIONS

A. Mendelson, D.K. Pradhan, A.D. Singh, "A Single Cached Copy Data Coherence Scheme for Multiprocessor Systems", Dec. 1989, ACM, vol. 17, p. 36-49.*

Michael Franklin and Michael J. Carey, "Client-server Caching Revisited", 1992, p. 1-23.*

Franklin et al., "Transactional Client-Server Cache Consistency: Alternatives and Performance," ACM Transactions on Database Systems, ACM, New York, NY, vol. 22, No. 3, Sep. 1, 1997, 44 pgs.

Bibliographix Information for Theses, [online], Berlin, DE, Retrieved Oct. 31, 2008, <http://www.diss.fu-berlin.de/diss/receive/FUDISS_thesis-000000001473>, 3 pgs.

Kwon et al., Deferred Locking with Shadow Transaction for Client-Server DBMSs, Journal of Systems Architecture, Elsevier Science Publishers BV., Amsterdam, NL, vol. 53, No. 7, Jul. 1, 2006, pp. 373-393.

Hartwich, A Middleware Architecture for Transactional, Object-Oriented Applications, [online] Freie University Berlin, Berlin, DE, Nov. 14, 2003 [retrieved Oct. 31, 2008] retrieved from the Internet: <http://page.mi.fu-berlin.de/hartwich/diss-final.pdf> 209 pgs.

Gray, J. et al., "Transcation Processing: Concepts and Techniques," Morgan Kaufmann, pp. 434-435.

U.S. Appl. No. 12/199,632, Non-Final Office Action, dated May 27, 2011, 9 pg.

U.S. Appl. No. 12/199,632, Notice of Allowance, dated Oct. 7, 2011, 8 pg.

U.S. Appl. No. 13/295,540, Non-Final Office Action, dated Feb. 4, 2013, 7 pg.

U.S. Appl. No. 13/295,540, Final Office Action, dated Aug. 20, 2013, 9 pg.

U.S. Appl. No. 13/295,540, Non-Final Office Action, dated Jun. 25, 2014, 8 pg.

U.S. Appl. No. 13/295,540, Non-Final Office Action, dated Apr. 10, 2015, 10 pg.

U.S. Appl. No. 13/295,540, Final Office Action, dated Oct. 28, 2015, 11 pg.

U.S. Appl. No. 13/295,545, Non-Final Office Action, dated Feb. 3, 2013, 6 pg.

U.S. Appl. No. 13/295,545, Non-Final Office Action, dated Aug. 22, 2014, 7 pg.

U.S. Appl. No. 13/295,545, Non-Final Office Action, dated Mar. 25, 2015, 11 pg.

U.S. Appl. No. 13/295,545, Final Office Action, dated Oct. 8, 2015, 13 pg.

U.S. Appl. No. 13/295,545, Notice of Allowance, dated Feb. 16, 2016, 9 pg.

* cited by examiner

ACCESSING DATA ENTITIES

FIELD OF THE INVENTION

The invention relates to a method of accessing data entities in a client-server system and to a client-server system.

BACKGROUND

In today's information age, the ability to access rapidly data that is held in databases is of utmost importance to companies and organizations whose business may rely on the data. The speed with which a client is able to access data on a database relies on two major factors. The first factor is the speed with which the database file server can read data typically from a co-located repository which can be regarded as a storage device or as a storage system. This factor relies on the speed of the central processing unit (CPU) and on the disc access speed of the file server. The second factor is the capacity, or the bandwidth, of the communications link between the client and the file server.

A third factor effecting database access speed, which is extremely significant to the performance of an overall system, is the load on the system. The load is typically proportional to the number of clients which require database access. Both, the number of operations performed by the CPU and the volume of data which needs to be transmitted across communications links increases as more clients require database access.

System performance can be improved by increasing the speed of the file server and the bandwidth of the communications links. However, the related costs cannot always be justified. Also, there is always a limit to the speed at which current technologies can operate.

Another way of achieving better system performance, by reducing the database CPU and communications link load, is by using cached copies of the data. The cached copies are typically located physically nearer to the clients, or even on the client systems themselves. Indeed, this technique has been widely adopted on the internet by using internet file servers containing cached copies of the data located at 'mirror sites'. For example, master data accessible from a master internet file server at a site in the USA might be copied or cached to a file server at a mirror site in the UK, from where a majority of European users might prefer to read the data. Thus, the data transfer overhead for transatlantic links and the demands placed on the master internet file server are reduced, and the overall perceived internet performance is improved. In particular, the European users would expect to obtain far better data access performance by using the UK mirror site.

The use of cached data does raise important issues concerning data consistency. It is sometimes difficult to know whether cached data is the same as the original, master data. The original data may change in some way after the cached copy is generated. In the case of the internet, for example, at present a lack of consistency between master data and cached data may not be of great significance and, if it is significant, it is usually possible to choose to retrieve the master data, albeit at a slower rate, from the master database.

Cache consistency, or coherency, is however extremely important in commercial environments where the data, whether cached or master, forms the basis for making business decisions. Inconsistent data, or data which takes too long to access, inevitably results in reduced revenue. A simple example of such an environment is one for making flight bookings, where, for example, the master flight data is held in a database in the UK and travel agencies around Europe book seats on flights on the basis of cached data. In this example, under most circumstances, it is essential that the cached data is consistent with the original data.

Similar considerations are important in a general multi-user system, for example based on client-server or distributed database, network environments, in which the user wherever possible rely on cached data to minimize CPU, data access, data transfer overheads imposed on master database file servers, and overall network traffic.

In, for example, a client-server environment having multiple clients accessing a single, master database file server, there is typically considerable opportunity to maintain with each client a large cache of recently read data. A cache may be used during an active transaction to avoid the need to re-read data from the master database. However, if data is cached on a client and the client needs to re-access that data at a later time, unless the data in the master database cannot change, it must be assumed that the data on the cache is inconsistent, because there is no way of knowing differently. Thus, further master database access is needed to at least compare the current state of data in the master database with the data in the cache database.

A decision whether or not to use data caching typically depends on the type of data to be accessed. WO 97/21177 mentions three common categories of data that are described below.

Static data, that is data which rarely changes, are prime candidates for holding in a client cache database. The data can always be assumed to be current. However, usually a task must be provided to ensure that changes to the static data are propagated to all client caches. This is typically done using an overnight batch process. For static data, there is no need for a real-time process to maintain consistency.

Highly dynamic data is difficult to maintain in a consistent state. The basic reason is that if the data changes very often, the network and processor impact, in a client-server environment, of up-dating many client caches can be considerable. In some cases, the cost in terms of processing overhead and network bandwidth of maintaining the caches might exceed the cost of each client accessing the master database directly each time data is required. Thus, this category of data would typically not be cached.

In between static and highly dynamic data is a type of data which is not static, but which changes relatively infrequently compared with highly dynamic data. Typically, in this case, data might only be cached onto a client cache database, for example at a travel agency, during the period of an aircraft flight enquiry and seat booking operation. Then, there would be a high degree of certainty that the data remains consistent during the operation. However, there would never be total certainty because, coincidentally, another client, or travel agency might book the only remaining seats on the respective flight between the times on which the first client started and completed its operation.

The simplest way to prevent data inconsistency, in for example the flight booking operation described above, would be to 'lock' any data on the master database which has been accessed by one client, thus making that data inaccessible, or at least only readable, to other clients for the whole period of the operation. This is called 'pessimistic locking'. Typically, a lock table, which holds the identities of locked data which cannot be accessed or written to, is generated by the master file server. Such a system requires that all access requests made by clients invoke a lock table search on the file server before data access or writing is allowed, or denied.

However, in an environment where the same data might need to be accessed or up-dated by several clients, for example for flight-booking purposes, pessimistic locking represents an unworkable solution with intolerable locking overheads.

Another way of dealing with possible inconsistency between cached and master data is discussed in the book 'Transaction Processing—Concepts and Techniques' by J. Gray and A. Reuter, published by Morgan Kaufmann in 1993, on pages 434-435. The method involves 'optimistic locking'.

Optimistic locking allows clients connected to a file server to use cached data at any time for reading purposes, but as soon as a transaction is initiated, for example making a flight seat booking, the cached data is compared with the master data to ensure data consistency and the master data is locked only for the period of the actual transaction. In this example, the transaction relates to the actual database access and to a write procedure. This prevents another client from changing the master data during the transaction. If, after the transaction has been initiated, the data in the cache database is found to be inconsistent with the corresponding data in the master database, the cache database is updated with the latest master data, and the client is notified and left to resolve any problems the inconsistency might have caused.

The advantage of optimistic locking is that the master data is only locked for a very short period of time, for maybe less than one second, to carry out the actual transaction. In contrast, pessimistic locking requires the data accessed to be locked for the whole period of an operation, for example for the whole period of an enquiry and a transaction, which might take many minutes.

Although optimistic locking may therefore require extra processing by both, a client and a file server, it can be seen that the technique is far better suited for dealing with relatively dynamic data which may need to be accessed by multiple clients.

When implementing optimistic locking, it is known sometimes to use time stamping to mark data rows in the master database with the time the data was last updated. In this way, if the time stamp for a particular row of data held in a cache is the same as the row in the master database, the file server accepts that the cached data is current and there is no need to re-send the data row in question across the network to the client. Thus, network bandwidth is conserved whenever a cached copy is found to be current.

WO 97/21177 provides a method for checking the consistency of an item of data in a cache database with a respective item of data in a master database by comparing a first key stored in association with the item of data in the cache database with a second key stored in association with an index entry for the respective item of data in the master database. The above mentioned document further provides a method for retrieving an item of data from one of a cache or a master database, the master database comprising a plurality of items of master data and an index containing entries corresponding to one or more of the items of master data, the cache database containing a cache copy of at least one item of the master data.

The method according to the above mentioned document is particularly disadvantageous as it requires the storing of the 'key' associated with the cached and master data in a separate data index in order to address, e.g., deleted data items. This increases the overhead of the file server and of the communications between the file server and the requesting clients.

There is a need for an improved method of accessing data in a client-server system.

SUMMARY OF THE INVENTION

According to a first aspect of the invention, there is provided a method of accessing data entities in a client-server system. In accordance with an embodiment of the invention, the client-server system comprises a set of clients, a server system, and a repository for storing a plurality of data entities. The server system comprises an inter-transactional cache. The inter-transactional cache is accessible for each client of a set of clients. Each client of the set of clients further comprises an intra-transactional cache. In particular, a first client of the set of clients comprises a first intra-transactional cache. If a first data entity which the first client wants to access is not located in the first intra-transactional cache, the first client consults the inter-transactional cache.

The method in accordance with the invention therefore further comprises the step of determining whether a cached copy of a first data entity of the plurality of data entities is held by the inter-transactional cache. Furthermore, a version identifier of the original first data entity is read from the repository, if the cached copy of the first data entity is in the inter-transactional cache.

It is furthermore determined whether the first data entity is accessed with an exclusive lock and if the version identifier of the copy and the version identifier of the original first data entity match. A copy of the cached copy of the first data entity is then added to the first intra-transactional cache. Furthermore, the copy of the copy of the first data entity in the first intra-transactional cache is accessed for further processing of the first data entity by the first client.

The repository associated with the client-server system can be regarded as storage system that is used to store a plurality of data entities. The server system can furthermore be regarded as file server that enables the clients of the plurality of clients to access the repository. The repository can thus be regarded as a database system associated with a file server that can be accessed via the client-server system by the clients.

The client-server system further comprises the inter-transactional cache that can be used and accessed by all the clients and which is used to store a cached copy of the first data entity so that it can be accessed by other clients. The inter-transactional cache complements the set of intra-transactional caches. The inter-transactional cache provides the advantage that the clients of the set of clients might get access to a data entity that has been retrieved from the repository by another client so that the client seeking access to the data entity does not need to re-read the particular data entity from the repository which leads to a reduction of the processing time of the data entity by the particular client and contributes to a reduction of the used resources of the client-server system.

In addition, the inter-transactional cache provides also the advantage that the same client accessing and/or modifying the same data entity in subsequent transactions does not need to re-read the entire data entity from the repository.

In accordance with an embodiment of the invention, the method further comprises adding a reference for the copy of the first data entity to the first intra-transactional cache, if the copy of the first data entity is associated with a non-exclusive lock. Furthermore, a client 'lock entry' is added to a lock list. The client 'lock entry' is in the following also denoted as client lock entry. The lock list is comprised in the first data entity, and the client lock entry indicates the locking level of the first data entity. The client lock entry is furthermore removed from the first data entity lock list in the inter-transactional cache, if the client lock entry relates to a non-exclusive lock.

In accordance with an embodiment of the invention, it is determined whether a copy of the first data entity is in the first intra-transactional cache of the first client. The inter-transactional cache is accessed, if no copy of the first data entity is stored in the first intra-transactional cache of the first client.

In accordance with an embodiment of the invention, the original or master first data entity is read from the repository, if the copy of the first data entity is not stored in the inter-transactional cache or if the version identifiers of the original first data entity and the copy of the first data entity in the inter-transactional cache mismatch.

In accordance with an embodiment of the invention, a reference to the copy of the first data entity stored in the inter-transactional cache is added to the first intra-transactional cache and the copy of the first data entity is accessed in the first intra-transactional cache, if the lock level of the copy of the first data entity is higher than or equal to a requested lock level.

In contrast, the original or master first data entity is re-read from the repository by use of an exclusive lock, if the lock level of a copy of the first data entity is lower than the requested lock level. Then, a client lock entry is removed from the copy of the first data entity in the inter-transactional cache, if the original first data entity is re-read and the first data entity is not currently referenced by another client.

In accordance with an embodiment of the invention, the method in accordance with the invention is performed by the first client, which requests and which wants to have access to the first data entity.

In accordance with an embodiment of the invention, the first data entity comprises a key, wherein according to a further step of the method in accordance with the invention, the key of the first data entity is obtained.

In accordance with an embodiment of the invention, the version identifier of the copy of the copy of the first data entity in the first intra-transactional cache is changed in response to an update performed on the copy of the copy of the first data entity. The copy of the copy of the first data entity is written to the repository as a replacement for the original first data entity. A lock put by the first client on the original first data entity is released and the up-dated copy of the copy of the first data entity is moved (copied and deleted) from the first intra-transactional cache to the inter-transactional cache if the copy of the first data entity is not referenced by a concurrent client transaction.

In accordance with an embodiment of the invention, the version identifier of the first data entity relates to a number or to a time stamp or is generated by a sequence-generator or UUID-generator, wherein the acronym UUID stands for universal unique identifier. In case the version identifier relates to a number, a change of the version identifier as mentioned above might relate to an increment of the number.

In accordance with an embodiment of the invention, the original first data entity comprises a data object in a raw data format. The first client builds a de-serialized data object from the data object in the raw data format.

In accordance with an embodiment of the invention, the first client processes in particular the de-serialized data object. The data entities of the plurality of data entities might be stored on the repository in a raw data format. Building the data object from the raw data format is typically done by de-serializing the raw data object. This is typically done on the client's side. The cached copies of a data entity in the intra-transactional cache of a client or in the inter-transactional cache shared by many clients typically comprise the corresponding data objects in a de-serialized form. A client which can employ a data entity is thus enabled to immediately process the de-serialized data object and must therefore not perform de-serialization operations on the data objects of data entities obtained from the repository.

Data entities comprising data objects in serialized form are frequently employed in workflow management systems (WFMSs). The serialized data objects relate then typically to a sequence of bytes, persisted as large object (or raw) columns in a relational database. If the WFMS is implemented in Java, the data objects are typically Java objects. The same concept applies to other programming languages, too.

In order to work with the Java objects in the workflow management system, the binary data corresponding to the serialized data object must be retrieved from the database and the corresponding Java objects are generated by de-serializing the raw data objects.

In accordance with an embodiment of the invention, an updated de-serialized data object is serialized to an up-dated raw data object, if the de-serialized data object of the copy of the copy of the first data entity is updated.

In accordance with an embodiment of the invention, the access to the inter-transactional cache of the first client is synchronized. In particular, the access of the first client is synchronized with the other clients of the set of clients.

In accordance with an embodiment of the invention, the first data entity is accessed and processed by the first client as part of a physical transaction.

Access to data within client-server systems is typically performed in the context of a physical transaction. A transaction may include interaction with multiple distinct resources (such as a database system). To guarantee transactional consistency, locks on data entities are employed. Complex systems, such as workflow management systems offer business transactions on a higher abstraction level. Rollback of a physical transaction during data entity access might trigger more extensive operations to guarantee consistency of the business transaction and thereby impacts system performance significantly. The method in accordance with the invention is particular advantageous as it allows implementing data access strategies, e.g. in workflow management systems, that avoid transaction rollbacks.

According to a second aspect of the invention, there is provided a computer program product for accessing data entities in a client-server system. The computer program product comprises computer executable instructions. The computer executable instructions are adapted to perform steps of the method in accordance with the invention.

According to a third aspect of the invention, there is provided a client-server system having a set of clients, wherein a first client of the set of clients comprises a first intra-transactional cache. The client-server system further comprises at least one server system. The server system comprises an inter-transactional cache and the inter-transactional cache is accessible for each client of the set of clients. The client-server system also comprises a repository for storing a plurality of data entities and components that are adapted to perform steps of the method in accordance with the invention.

In accordance with an embodiment of the invention, the server system and clients of the set of clients may reside on the same physical computer system. The server and the clients can thus be regarded as logical systems rather than physical ones.

In accordance with an embodiment of the invention, the client-server system relates to a workflow management system.

In accordance with an embodiment of the invention, the set of clients relates to a plurality of threads hosted by one or more Java Virtual Machines (JVMs) and the inter-transactional cache is hosted by the same set of JVMs, a different JVM or distributed among a plurality of different JVMs.

In accordance with an embodiment of the invention, the client-server system comprises a first JVM and a second JVM, wherein the first JVM runs a client application in at least one thread, wherein the second JVM runs the same client application in at least one thread, wherein each JVM further hosts an inter-transactional cache, wherein the inter-transactional caches are either logically shared or not shared between the first and second JVMs.

For multiple JVMs, hosting not shared inter-transactional caches, the client applications may be adapted to employ server affinity. A follow-on transaction is thus conducted or enforced to run on the JVM on which the previous transaction was running. Thus, the client application performing the follow-on (physical) transaction might be able to make use of cached data entities employed by the previous transaction as the cached data entities might still be stored in the corresponding inter-transactional cache.

BRIEF DESCRIPTION OF THE DRAWINGS

In the following embodiments of the invention will be described in greater detail by way of example only making reference to the drawings in which.

DETAILED DESCRIPTION

Figure 1:
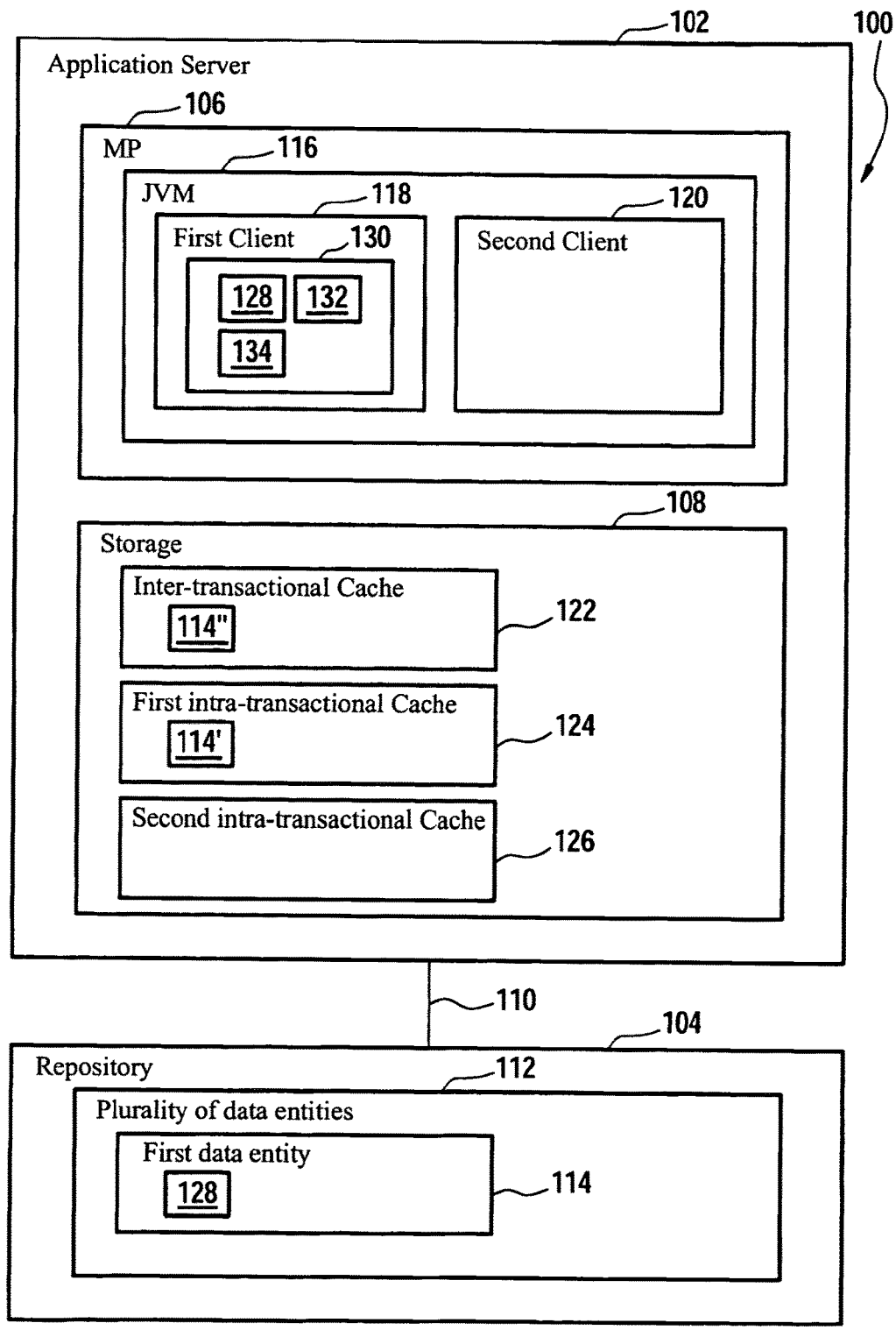
FIG. 1 shows a block diagram of a client-server system.

FIG. 1 shows a block diagram of a client-server system 100. The client-server system 100 comprises an application server 102 and a repository 104. The application server 102 can be regarded as a computer system and comprises a microprocessor 106 and storage 108. The application server 102 and the repository 104 are connected via a communication link 110 which might relate to a network connection. The repository 104 might, of course, also be part of the application server 102.

The microprocessor 106 executes a so called Java Virtual Machine 116. The Java Virtual Machine (JVM) 116 can be regarded as a set of computer software programs and data structures which implements a specific virtual machine model. This model accepts a form of computer intermediate language, commonly referred to as Java byte code, which conceptually represents the instruction set of a stack-oriented, capability architecture. The code is most often generated by Java language compilers, although the Java virtual machine can also be targeted by compilers of other languages.

Since the application server 102 executes via the microprocessor 106 the Java virtual machine, the application server 102 can furthermore be regarded as a Java platform. It is furthermore evident to the skilled person, that the microprocessor 106 might not directly execute the Java virtual machine 116, but might execute an operation system which hosts the JVM 116.

The Java Virtual Machine 116 furthermore runs a first client 118 and a second client 120. The first and the second clients 118 and 120 can be regarded as threats on the JVM 116.

The storage 108 comprises an inter-transactional cache 122 which can be accessed by the first client 118 and the second client 120. The storage 108 furthermore comprises a first intra-transactional cache 124 and a second intra-transactional cache 126. The first intra-transactional cache 124 can only be accessed by the first client 118 and the second intra-transactional cache 126 can only be accessed by the second client 120.

The inter-transactional cache 122 and the first and second intra-transactional caches 124 and 126 can be regarded as logical storage spaces managed by the JVM 116. The inter-transactional cache 122 is accessible by both clients 118 and 120. The intra-transactional caches 124, 126 are exclusively assigned to one of the clients 118 and 120, respectively.

The repository 104 comprises a plurality of data entities 112. The plurality of data entities 112 comprises a first data entity 114. The first data entity 114 on the repository is further referred to as original data entity 114.

The first data entity 114 comprises a key 128 by which the first data entity 114 is identifiable. Thus, the key 128 is uniquely assigned to the first data entity 114. In order for the first client 118 to access the first data entity 114, the first client 118 uses the key 128 of the first data entity 114. The first client 118 requests by use of a request 130 for the first data entity by placing the key 128 into the request 130.

The first client 118 furthermore specifies the desired lock level 132 for the first data entity in the request 130 according to which the first client 118 wishes to access the first data entity 114. A lock level might be either a shared lock or an exclusive lock. A shared lock is also referred to as non-exclusive lock.

In order to process the request 130 for getting access to the first data entity 114, the first client 118 first checks the first intra-transactional cache 124 if a cached copy of the first data entity 114' is comprised therein. If a cached copy of the first data entity 114' is found therein and if the lock level of the copy of the first data entity matches the requested lock level, then the first client 118 accesses the cached copy of the first data entity 114' and further processes it. The lock level might be for example specified in a list comprised within the first data entity 114' which will be elaborated further below.

If a copy of the first data entity 114' is stored in the first intra-transactional cache 124, but the lock levels as requested by the first client 118 and the lock level of the copy of the first data entity do not match, the first data entity 114 is read by the first client 118 from the repository server and a potentially existing copy of the first data entity comprised in the inter-transactional cache which is also accessible by the first client 118 is removed.

Furthermore, if the data entity is not in the first intra-transactional cache 124, synchronized access to the inter-transactional cache 122 is used in order to check, if a cached copy of the first data entity 114" is comprised in the inter-transactional cache 122. If not, the original first data entity 114 is read from the repository 104 and added to the first intra-transactional cache 124 of the first client 118.

Furthermore, the lock list is updated with an entry indicating the ID 134 of the first client and the requested lock level 132. If the requested lock level 132 relates to a shared lock, subsequent client requests, coming from the first client 118 as well as from the second client 120, may use the same copy of the first data entity 114" in the inter-transactional cache 122. Thus, at the end of the physical transaction, the copy of the first data entity 114 is added to the inter-transactional cache 122 in this case.

In any way, the first data entity has become available for the first client 118 in the intra-transactional cache for access by the first client 118.

If the copy of the first data entity 114" is stored in the inter-transactional cache 122, then the version identifier of the original data entity 114 is read from the repository 104 by use of a lock level that corresponds to the lock level 132. This ensures that the transaction of the first client 118 on the repository 104 causes the same locks on the repository with respect to the first data entity as if no inter-transactional cache 122 would be used.

If the version identifier of the original master first data entity 114 as stored in the repository 104 does not match the version identifier of the cached copy of the first data entity 114" in the inter-transactional cache 122, then the entry in the inter-transactional cache 122 is disregarded and processing continuous with reading the original first data entity 114 from the repository 104. If the version identifier of the first data entity 114" in the inter-transactional cache 112 matches with the version identifier of the original first data entry 114, and the lock level 132 relates to a shared lock, then a reference to the copy of the data entity as comprised in the inter-transactional cache 122 is added to the first intra-transactional cache 124 and the lock list entry for the client's ID 134 and the locking level which corresponds then to a non-exclusive lock is added.

In contrast, if an exclusive lock is specified in the lock level 132, a copy of the cached copy of the first data entity 114" is created and added to the first intra-transactional cache 124.

The method in accordance with the invention is particularly advantageous as the inter-transactional cache 122 is also accessible by the second client 120. The copy of the first data entity 114" remains in the inter-transactional cache 122 after the end of the transaction of the first client 118. Thus, the second client 120 might benefit from the cached copy of the first data entity 114" in case it needs to access this data entity in a subsequent transaction.

The first data entity 114 might for example relate to a data entity as employed in workflow management system and comprise a raw data object in a serialized form. In order for the JVM 116 and thus for the first and second clients 118 and 120 to be able to process the first data entity 114, the raw data object must be de-serialized into a Java object. The cached copies in the intra-transactional caches and in the inter-transactional cache of the first data entity 114' and 114" differ from the original first data entity 114 in that the cached copies comprise the Java object and not the raw data object. Thus, a client accessing the data entity 114' and 114" is able to directly perform operations on the Java object and must not at first generated the Java object before being able to process it. This leads to a reduction in the overall processing time for the client-server system 100.

Figure 2:
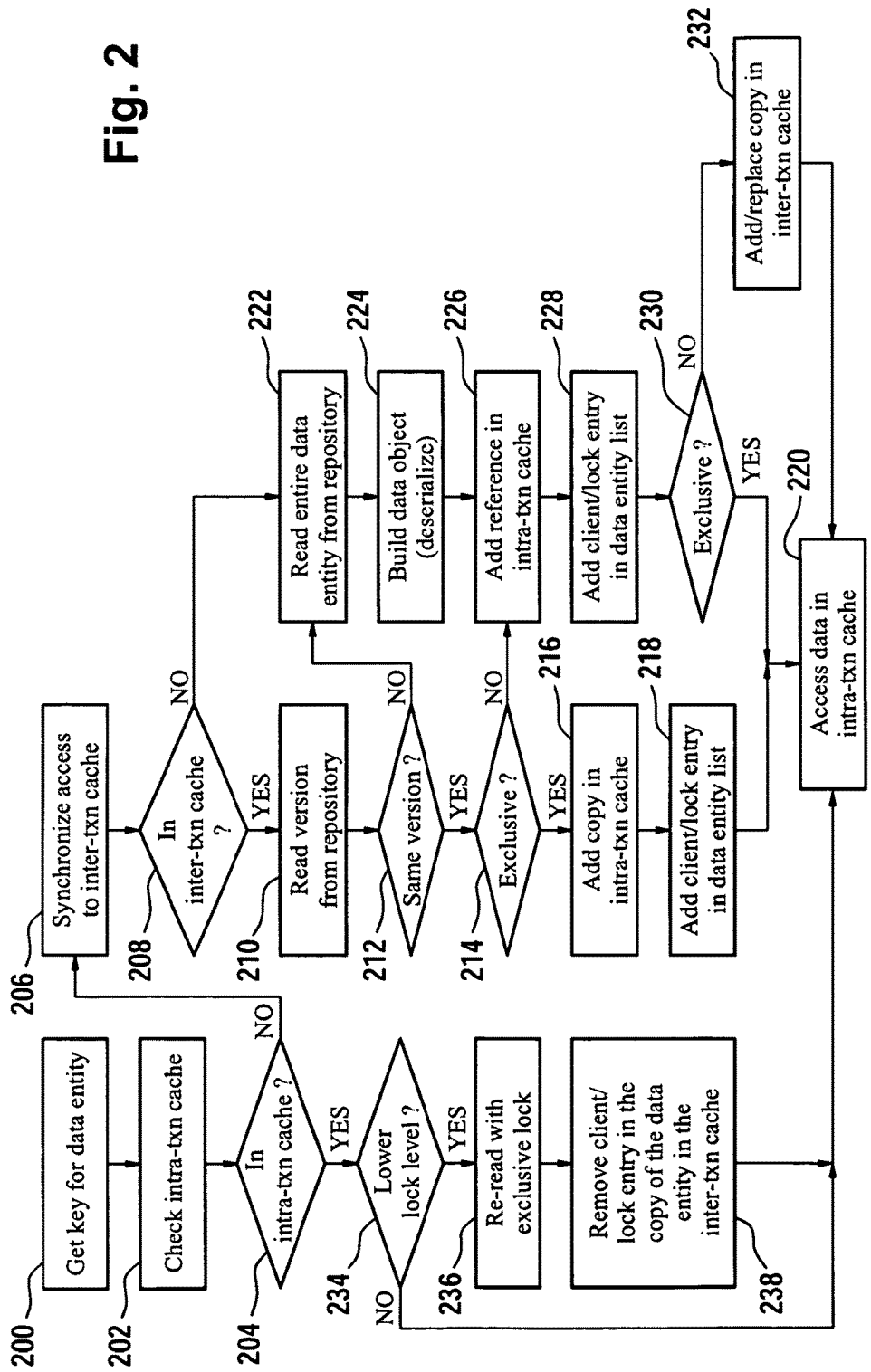
FIG. 2 shows a flow diagram illustrating steps performed by a method in accordance with the invention.

FIG. 2 shows a flow diagram illustrating steps performed by a method in accordance with the invention. The steps are performed by a client of a client-server system in order to access a data entity. The original of the data entity is held in a repository associated with the client-server system. It is assumed that the data entity is identifiable by a unique key which is also employable for a quick comparison. The key might be generated by the repository which holds the original data entity or might be a globally unique key generated by the client based on established algorithms.

According to step 200 of the method in accordance with the invention, the client requests the data entity by use of the key and furthermore specifies the desired lock level which might be either shared (non-exclusive) or exclusive.

According to step 202 of the method in accordance with the invention, the client checks the intra-transactional cache (intra-txn cache) which is a cache that can only be accessed by the client and not by other clients that might be associated with the client-server system. In step 204, the client determines whether the data entity is stored in the intra-transactional cache and whether the lock level of the data entity matches the requested lock level. The lock level of the data entity stored in the intra-transactional cache might for example be stored in a lock level list that is comprised within the data entity.

If the data entity is not comprised in the intra-transactional cache, the method in accordance with the invention proceeds with step 206, wherein synchronized access to an inter-transactional cache (inter-txn cache) of the client-server system is used. The inter-transactional cache can be accessed by all clients that are associated with the client-server system and thus, the inter-transactional cache can be regarded as a complement to the intra-transactional caches, since each intra-transactional cache is assigned to a particular client.

According to step 208 of the method in accordance with the invention, the client checks if the data entity is comprised in the inter-transactional cache. If the data entity is comprised in the inter-transactional cache, the method in accordance with the invention proceeds with step 210, wherein the client reads the version identifier of the original data entity from the repository by use of a lock level that corresponds to the requested lock level. This ensures that the client transaction causes the same locks on the repository as if no inter-transactional cache would be used.

According to step 212 of the method in accordance with the invention, the read version identifier of the original data entity is compared with the version identifier of the data entity comprised in the inter-transactional cache. If the version identifiers match, the method in accordance with the invention proceeds with step 214. Step 214 is continued by step 216 if exclusive access is requested for the data entity. In step 216, a copy of the data entity comprised in the inter-transactional cache is created and added to the intra-transactional cache of the client. Furthermore, according to step 218 of the method in accordance with the invention, the exclusive lock is added to the lock list comprised to the data entity that is copied to the intra-transactional cache in order to allow for a check according to step 234 that will be described further below.

The method in accordance with the invention flows then to step 220. The client accesses the data entity in the intra-transactional cache for further processing.

If it is found in step 212 that the version identifiers do not match, then the method in accordance with the invention proceeds with step 222, wherein the entire data entity is read from the repository. In step 224, a data object is built from the raw data comprised in the data entity. This means that the raw data as comprised in the data entity is deserialized.

Then, according to step 226 of the method in accordance with the invention, a reference to the data entity comprised in the inter-transactional cache is added to the intra-transactional cache and, according to step 228, a client lock entry is added to the lock list comprised in the data entity. According to step 230, the flow further proceeds with step 220 if the requested lock for the data entity corresponds to an exclusive lock.

Step 232 is performed next to step 230, if the requested lock corresponds to a non-exclusive (shared) lock. According to step 232 of the method in accordance with the invention, a copy of the read and deserialized data entity (cf. steps 222 and 224) is added to the inter-transactional cache or an older copy is replaced by the new copy. The flow continues then with step 220, wherein the client accesses the data entity in the intra-transactional cache for further processing.

Step 214 is continued by step 226, if a non-exclusive lock is requested for the data entity. Furthermore, if in step 204 it is found that the requested data entity is comprised in the intra-transactional cache of the client, the method in accordance with the invention proceeds with step 234, wherein it is determined if the cached data entity comprised in the intra-transactional cache is read with a lower lock level than the requested lock level. If true, this implies that the requested lock level is higher than the lock level of the cached data entity and the method in accordance with the invention proceeds with step 236, wherein the data entity is re-read from the repository by use of an exclusive lock and according to step 238, a potential lock entry in the copy of the data entity in the inter-transactional cache is removed. Step 220 is then performed subsequent to step 238. If the cached data entity comprised in the intra-transactional cache is read with a higher lock level than the requested lock level, the method in accordance with the invention proceeds directly with step 220.

Figure 3:
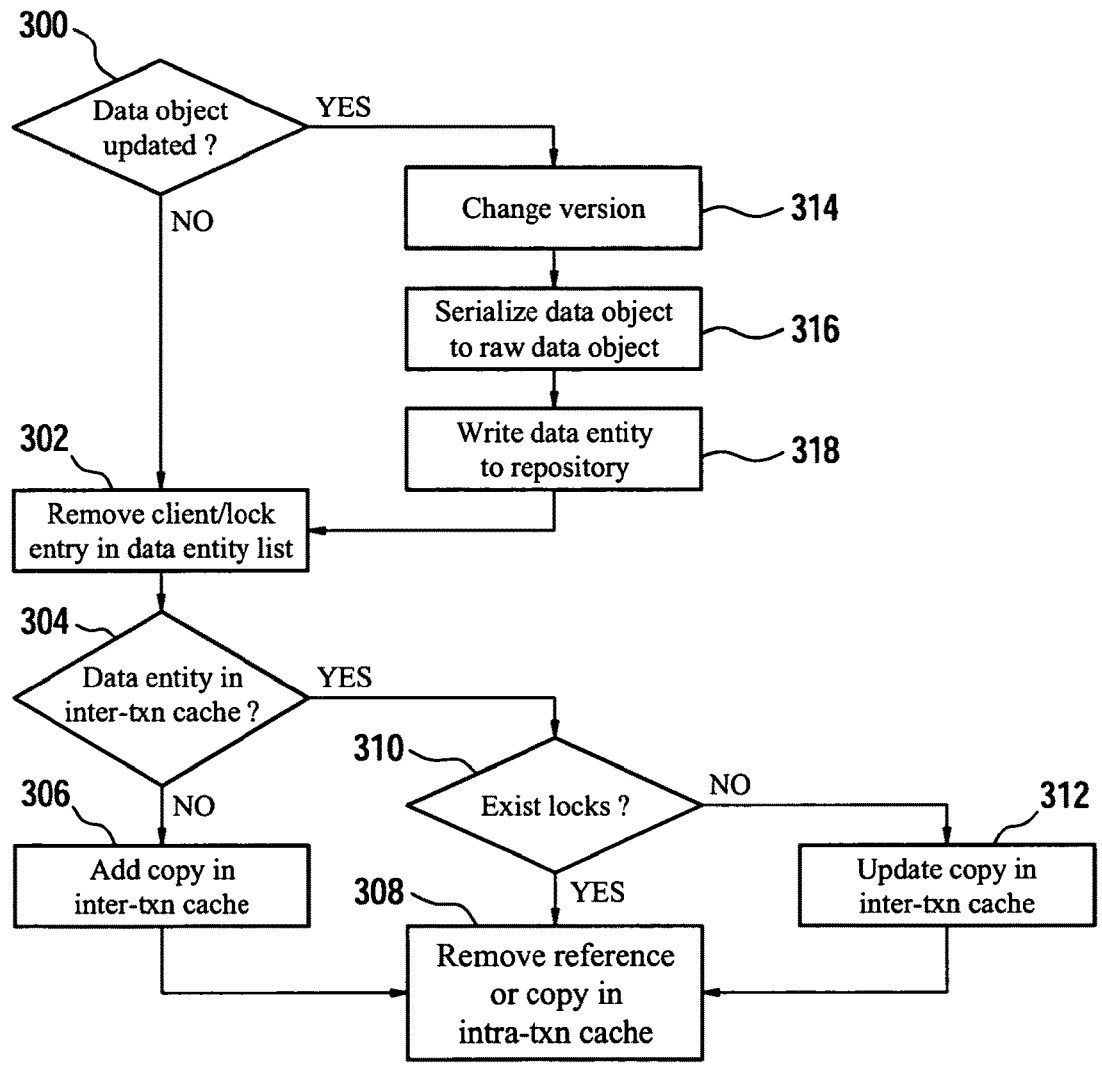
FIG. 3 shows a flow diagram illustrating steps performed by a method in accordance with the invention.

FIG. 3 shows a flow diagram that illustrates steps performed by a method in accordance with the invention. In particular, the steps for cache processing right before the end of a physical transaction of a data object are depicted in FIG. 3.

In step 300 of the method in accordance with the invention, it is determined whether the data object comprised in the data entity and which has been accessed by the client in its intra-transactional cache has been updated. If this is not the case, the method in accordance with the invention proceeds with step 302, wherein a client ID and a lock entry is removed in a data entry list of the data entity comprised in the intra-transactional cache.

Then, according to step 304 of the method in accordance with the invention, it is determined whether a copy of the data entity is stored in the inter-transactional cache. If this is not the case, the method in accordance with the invention proceeds with step 306, wherein the copy to the data entity comprised in the intra-transactional cache is added to the inter-transactional cache according to step 306. Furthermore, according to step 308, the copy or reference in the intra-transactional cache to the data entity is removed.

If it is found in step 304 that the data entity is comprised in the inter-transactional cache, then the method in accordance with the invention proceeds with step 310, wherein it is determined whether or not locks exist for the corresponding data entity. If this is the case, the method proceeds with step 308. If this is not the case, the method in accordance with the invention proceeds with step 312, wherein the copy of the data entity is updated in the inter-transactional cache. Step 308 is then performed subsequent to step 312.

If it is found in step 300 that the data object of the data entity has been updated by the client, then the version identifier of the data entity is changed according to step 314 of the method in accordance with the invention.

Then, according to step 316 of the method in accordance with the invention, the updated data object of the data entity is serialized and a raw data object is generated due to the serialization. Then, according to step 318 of the method in accordance with the invention, the data entity comprising the raw data object is written to the repository. Step 302 is then performed subsequent to step 318.

Figure 4:
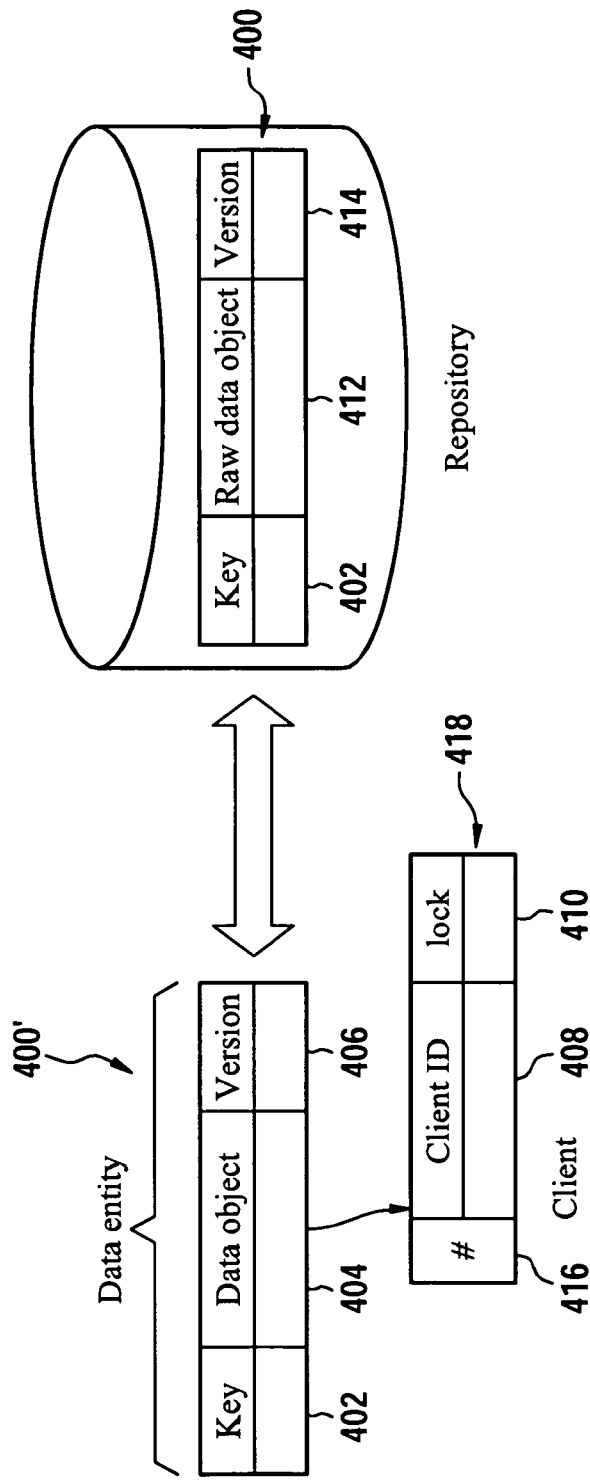
FIG. 4 illustrates schematically properties of a data entity on the client side and on the side of the repository.

FIG. 4 illustrates schematically properties of a data entity 400' on the client's side and of the corresponding (original) data entity 400 on the repository side. The data entity 400' comprises a key 402, a data object 404, and a version identifier 406. Furthermore, the data object 400' comprises a lock list 418. The lock list 418 comprises entries, wherein an entry has a list number 416, a client ID 408 and corresponding lock level 410. The corresponding original or master data entity 400 on the repository comprises the key 402, a raw data object 412, and a version identifier 414. The data entity 400 and 400' may contain additional data fields which are not subject to optimization regarding de-serialization but can certainly accompany the resulting object on the client.

The key 402 is uniquely assigned to the data entities 400 and 400' which corresponds to the cached copy of the master data entity 400. The key 402 can thus be used to identify the data entity 400, 400' and to distinguish the data entity 400, 400' from other data entities comprised in the repository. The key 402 might for example be a number code or something equivalent.

The data entity 400 differs from the cached copy 400' in that the cached copy comprises a data object 404 and the master data comprises a raw data object 412. The data object 404 corresponds for example to a Java object that can be processed by a Java Virtual Machine. The data object 404 is generated from the raw data object 412 by use of a de-serializing operation.

The data object 404 comprises an entry with the client ID 408 in its lock list 418. Thus, the client that requests the data entity 400 creates the entry with the list number 416 and writes its ID therein. This is particularly advantageous as another client that accesses the data entity 400 when stored in the inter-transactional cache is able to identify which other client is using the data entity 400 concurrently.

The data object 404 furthermore comprises the lock list 418, wherein the requesting client specifies the lock level (exclusive or shared) 410 through which the client has requested the data entity 400. The lock list 418 is for example checked by other clients that have found the data entity 400', for example in the inter-transactional cache in order to find out if they can further process the cached data entity 400'.

The version identifier 406 of the data entity 400' can be compared with the version identifier 414 of the original data entity 400 in order to find out if the cached data entity 400' has undergone some change with respect to the original data entity 400. As mentioned with respect to FIG. 3, the version identifier 406 might for example relate to a number or a timestamp which is incremented or changed each time the data object 404 is updated.

Figure 5:
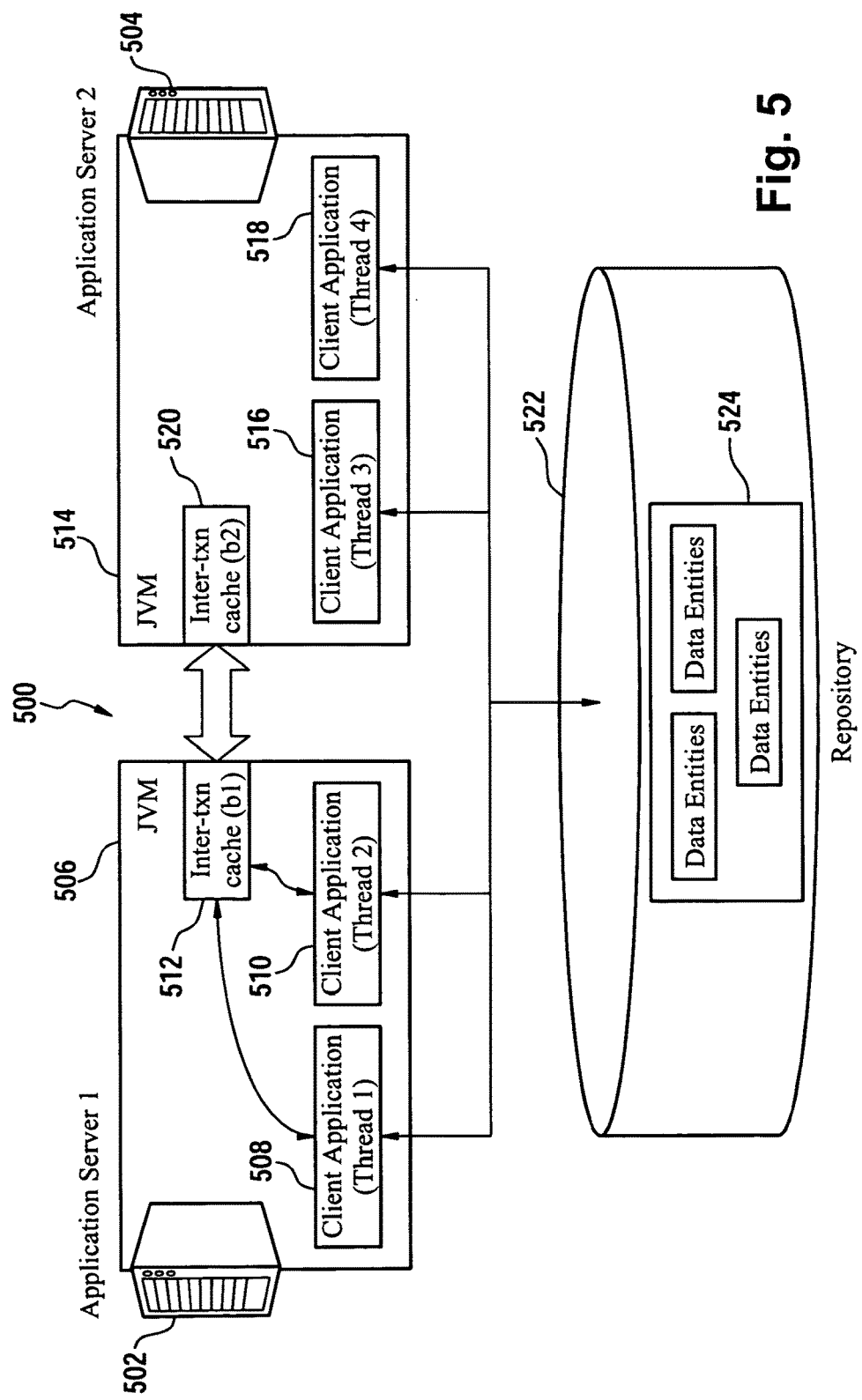
FIG. 5 shows a further block diagram of a client-server system.

FIG. 5 shows a block diagram of a client-server system 500. The client-server system 500 comprises a first application server 502 and a second application server 504. The first application server 502 hosts a Java Virtual Machine (JVM) 506 which runs a first client application 508 and a second client application 510. The Java Virtual Machine 506 furthermore comprises an inter-transactional cache 512. The second application server 504 also hosts a Java Virtual Machine 514 which comprises a third client application 516 and a fourth client application 518. The Java Virtual Machine 514 furthermore comprises an inter-transactional cache 520.

The client applications 508, 510, 516, and 518 can be regarded as threats on the corresponding JVMs 506 and 514, respectively. The application servers 502 and 506 provide a connection for the client applications 508, 510, 516, and 518 to a repository 522 which hosts a plurality of data entities 524.

Each client of the application servers 502 and 504 is able to access data entities on the repository 522 as described before for example with reference to FIGS. 2 and 3. Moreover, the client applications 508 and 510 can access the inter-transactional cache 512 and the client applications 516 and 518 are able to access the inter-transactional cache 520 which might comprise copies of the original data entities of the plurality of data entities 524.

The inter-transactional cache 512 of the JVM 506 and the inter-transactional cache 520 of the JVM 514 can be combined to a single inter-transactional cache by mechanisms such as a distributed map which are available for some J2EE application servers. The client applications 508 and 510 and the client applications 516 and 518 that are hosted by the application servers 502 and 504, respectively, are then able to access the same logical memory.

If the application servers do not offer services like distributed maps, alternatively, an additional application that might run on both application servers may maintain the inter-transactional cache corresponding to the combination of the inter-transactional cache 512 and the inter-transactional cache 520 and serve the same data entities to the client applications.

Furthermore, the client applications 508 and 510 as well as the client applications 516 and 518 might relate to identical client applications and the two JVMs 506 and 514 might not share the inter-transactional caches 512 and 520. The client applications might then enforce server affinity. A follow-on transaction is then enforced to run on the JVM on which the previous transaction was running. Thus, the client applications might be able to make use of cached data entities employed by the previous transaction.

List of Reference Numerals

| 100 | Client-server system |
| 102 | Application server |
| 104 | Repository |
| 106 | Microprocessor |
| 108 | Storage |
| 110 | Communications link |
| 112 | Plurality of data entities |
| 114 | Original first data entity |
| 114' | Cached first data entity |
| 114" | Cached first data entity |
| 116 | Java Virtual Machine |
| 118 | First client |
| 120 | Second client |
| 122 | Inter-transactional cache |
| 124 | First intra-transactional cache |
| 126 | Second intra-transactional cache |

-continued

List of Reference Numerals

| 128 | Key |
| 130 | Request |
| 132 | Lock level |
| 134 | ID of the first client |
| 400 | Data entity |
| 400" | Data entity |
| 402 | Key |
| 404 | Data object |
| 406 | Version identifier |
| 408 | Client ID |
| 410 | Lock |
| 412 | Raw data object |
| 414 | Version identifier |
| 416 | List number |
| 418 | Lock list |
| 500 | Client-server system |
| 502 | Application server |
| 504 | Application server |
| 506 | Java virtual machine |
| 508 | Client application |
| 510 | Client application |
| 512 | Inter-transactional cache |
| 514 | Java virtual machine |
| 516 | Client application |
| 518 | Client application |
| 520 | Inter-transactional cache |
| 522 | Repository |
| 524 | Plurality of data entities |

The invention claimed is:

1. A method, within an application server, of modifying an intra-transactional cache within the application server, comprising:
   determining that a copy of an original first data entity, accessed, by a first client, in the intra-transactional cache within the application server, has been updated to generate an updated intra-transactional cache copy stored in the intra-transactional cache;
   responsive to the determining that the copy of the original first data entity has been updated, determining that data corresponding to the updated intra-transactional cache copy is absent from an inter-transactional cache;
   responsive to the determining that the data corresponding to the updated intra-transactional cache copy is absent from the inter-transactional cache, storing data corresponding to the updated intra-transactional cache copy in the inter-transactional cache to generate an inter-transactional cache copy;
   responsive to the inter-transactional cache copy being generated, removing the updated intra-transactional cache copy from the intra-transactional cache; and
   removing, from a data entry list for the updated intra-transactional cache copy within the intra-transactional cache, a client ID and lock entry.

2. The method of claim 1, wherein both the intra-transactional cache and the inter-transactional cache are accessible by the application server.

3. The method of claim 1, wherein both the intra-transactional cache and the inter-transactional cache are within the application server.

4. A method, within an application server, of modifying an intra-transactional cache within the application server, comprising:
   determining that a copy of an original first data entity, accessed, by a first client, in the intra-transactional cache within the application server, has been updated to generate an updated intra-transactional cache copy stored in the intra-transactional cache;

responsive to the determining that the copy of the original first data entity has been updated, determining that data corresponding to the updated intra-transactional cache copy is also within an inter-transactional cache;

determining, upon a determination that the data corresponding to the updated intra-transactional cache copy is within the inter-transactional cache, whether a lock exists for the data corresponding to the updated intra-transactional cache copy within the inter-transactional cache;

removing, from the intra-transactional cache, the data corresponding to the updated intra-transactional cache copy; and removing, from a data entry list for the updated intra-transactional cache copy within the intra-transactional cache, a client ID and lock entry.

5. The method of claim 4, further comprising:

upon a determination that no lock exists for the data corresponding to the updated intra-transactional cache copy within the inter-transactional cache, updating the data corresponding to the updated intra-transactional cache copy within the inter-transactional cache.

6. The method. of claim 4, wherein both the intra-transactional cache and the inter-transactional cache are accessible by the application server.

7. A computer program product, comprising:

a computer usable hardware storage device having stored therein computer usable program code for modifying an intra-transactional cache within an application server, the computer usable program code, which when executed by the application server, causes the application server to perform;

determining that a copy of an original first data entity, accessed, by a first client, in the intra-transactional cache within the application server, has been updated to generate an updated intra-transactional cache copy stored in the intra-transactional cache;

responsive to the determining that the copy of the original first data entity has been updated, determining that data corresponding to the updated intra-transactional cache copy is absent from an inter-transactional cache;

responsive to the determining that the data corresponding to the updated intra-transactional cache copy is absent from the inter-transactional cache, storing data corresponding to the updated intra-transactional cache copy in the inter-transactional cache to generate an inter-transactional cache copy;

responsive to the inter-transactional cache copy being generated, removing the updated intra-transactional cache copy from the intra-transactional cache; and removing, from a data entry list for the updated intra-transactional cache copy within the intra-transactional cache, a client ID and lock entry.

8. The computer program product of claim 7, wherein both the intra-transactional cache and the inter-transactional cache are accessible by the application server.

9. The computer program product of claim 7, wherein both the intra-transactional cache and the inter-transactional cache are within the application server.

10. A computer program product, comprising:

a computer usable hardware storage device having stored therein computer usable program code for modifying an intra-transactional cache within an application server, the computer usable program code, which when executed by the application server, causes the application server to perform:

determining that a copy of an original first data entity, accessed, by a first client, in the intra-transactional cache within the application server, has been updated to generate an updated intra-transactional cache copy stored in the intra-transactional cache;

responsive to the determining that the copy of the original first data entity has been updated, determining whether that data corresponding to the updated intra-transactional cache copy is also within an inter-transactional cache;

determining, upon a determination that the data corresponding to the updated intra-transactional cache copy is within the inter-transactional cache, whether a lock exists for the data corresponding to the updated intra-transactional cache copy within the inter-transactional cache;

removing, from the intra-transactional cache, the data corresponding to the updated intra-transactional cache copy; and removing, from a data entry list for the updated intra-transactional cache copy within the intra-transactional cache, a client ID and lock entry.

11. The computer program product of claim 10, wherein the computer usable program code further causes the application server to perform:

upon a determination that no lock exists for the data corresponding to the updated intra-transactional cache copy within the inter-transactional cache, updating the data corresponding to the updated intra-transactional cache copy within the inter-transactional cache.

12. The computer program product of claim 10, wherein both the intra-transactional cache and the inter-transactional cache are accessible by the application server.

* * * * *